(12) United States Patent
Hornback

(10) Patent No.: US 10,138,795 B2
(45) Date of Patent: Nov. 27, 2018

(54) PLENUM CHAMBER FOR EXHAUST SYSTEM

(71) Applicant: FAURECIA EMISSIONS CONTROL TECHNOLOGIES, USA, LLC, Columbus, IN (US)

(72) Inventor: Jerome Brian Hornback, Greenwood, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 183 days.

(21) Appl. No.: 15/110,113

(22) PCT Filed: Feb. 18, 2014

(86) PCT No.: PCT/US2014/016764
§ 371 (c)(1),
(2) Date: Jul. 7, 2016

(87) PCT Pub. No.: WO2015/126353
PCT Pub. Date: Aug. 27, 2015

(65) Prior Publication Data
US 2016/0326937 A1 Nov. 10, 2016

(51) Int. Cl.
*F01N 13/00* (2010.01)
*F01N 3/021* (2006.01)
(Continued)

(52) U.S. Cl.
CPC ........... *F01N 13/009* (2014.06); *F01N 3/021* (2013.01); *F01N 3/103* (2013.01); *F01N 3/206* (2013.01);
(Continued)

(58) Field of Classification Search
CPC ........ F01N 13/00; F01N 13/009; F01N 3/021; F01N 3/103; F01N 3/206; F01N 3/2066;
(Continued)

(56) References Cited

U.S. PATENT DOCUMENTS 5,220,789 A * 6/1993 Riley ..................... B60K 13/04
181/240
8,083,822 B2 12/2011 Hoffman et al.
(Continued)

FOREIGN PATENT DOCUMENTS

| JP | 2005155404 A | 6/2005 |
| JP | 2009167806 A | 7/2009 |
| KR | 1020130086287 | 8/2013 |
| WO | 2012031536 | 3/2012 |

OTHER PUBLICATIONS

International Search Report from corresponding PCT/US2014/016764.

*Primary Examiner* — Brandon Lee
(74) *Attorney, Agent, or Firm* — Carlson, Gaskey & Olds, P.C.

(57) ABSTRACT

A vehicle exhaust system component assembly includes a first exhaust component defining a first center axis and a second exhaust component downstream of the first exhaust component and defining a second center axis that is spaced apart from and generally parallel to the first center axis. The first and second exhaust components are spaced apart from each other by an area. A plenum is positioned substantially within the area, and has a first end connected to the first exhaust component and a second end connected to the second exhaust component. The plenum is defined by a non-uniform cross-sectional shape as the plenum extends along a length from the first end to the second end. A doser is mounted to the plenum and is configured to inject a reducing agent to mix with exhaust gases within the plenum.

23 Claims, 1 Drawing Sheet

(51) Int. Cl.
*F01N 3/10* (2006.01)
*F01N 3/20* (2006.01)

(52) U.S. Cl.
CPC ........... *F01N 3/2066* (2013.01); *F01N 13/00* (2013.01); *F01N 2250/02* (2013.01); *F01N 2470/10* (2013.01); *F01N 2470/22* (2013.01); *F01N 2610/02* (2013.01); *F01N 2610/1453* (2013.01); *Y02A 50/2325* (2018.01); *Y02T 10/24* (2013.01)

(58) Field of Classification Search
CPC ............. F01N 2250/02; F01N 2470/10; F01N 2470/22; F01N 2610/02; F01N 2610/1453; Y02A 50/2325; Y02T 10/24
See application file for complete search history.

(56) References Cited

U.S. PATENT DOCUMENTS

| | | |
|---|---|---|
| 8,250,859 B2 | 10/2012 | Torisaka et al. |
| 8,276,372 B2 | 10/2012 | Kowada |
| 8,544,266 B2 | 10/2013 | Brück et al. |
| 8,955,312 B2 | 2/2015 | Watahiki et al. |
| 2007/0137182 A1 | 6/2007 | Driscoll |
| 2010/0154411 A1 | 6/2010 | Bruck et al. |
| 2010/0178215 A1 | 7/2010 | Honda et al. |
| 2010/1863882 | 7/2010 | Schroeder et al. |
| 2010/0205945 A1 | 8/2010 | Kowada |
| 2012/0023914 A1* | 2/2012 | Omote ............... B01D 53/9477 60/295 |
| 2013/0164181 A1 | 6/2013 | Iijima et al. |

* cited by examiner

PLENUM CHAMBER FOR EXHAUST SYSTEM

TECHNICAL FIELD

The subject invention relates to a vehicle exhaust system that utilizes a plenum style decomposition chamber.

BACKGROUND OF THE INVENTION

Exhaust systems are widely known and used with combustion engines. Typically, an exhaust system includes exhaust tubes or pipes that convey hot exhaust gases from the engine to other exhaust system components, such as mufflers, resonators, etc.

Most exhaust systems include diesel particulate filters (DPF) or NOx-storing catalysts. These filters or catalysts must be regenerated in regular intervals, as otherwise their flow resistance will increase excessively or their efficiency will decrease. Regeneration is referred to as "burning-off" because a thermal reaction takes place during the regeneration. This reaction can be initiated by a fuel or some other suitable, oxidizable fluid that can be directly introduced into the exhaust system upstream of the filter or catalyst.

In one known configuration utilizing a selective catalytic reduction (SCR) catalyst, the exhaust system includes an injection system with a doser that injects a reducing agent, such as a solution of urea and water for example, upstream of the SCR catalyst. The doser is typically mounted to a tube that connects the SCR catalyst to an upstream exhaust component. The doser typically sprays the urea directly into the exhaust stream immediately upstream of an inlet into the SCR catalyst. One disadvantage with this configuration is that the reducing agent may not be thoroughly mixed with the exhaust gas prior to entering the SCR catalyst.

SUMMARY OF THE INVENTION

According to one exemplary embodiment, a vehicle exhaust system component assembly includes a first exhaust component defining a first center axis and a second exhaust component downstream of the first exhaust component and defining a second center axis that is spaced apart from and generally parallel to the first center axis. The first and second exhaust components are spaced apart from each other by an area. A plenum is positioned substantially within the area, and has a first end connected to the first exhaust component and a second end connected to the second exhaust component. The plenum is defined by a non-uniform cross-sectional shape as the plenum extends along a length from the first end to the second end. A doser is mounted to the plenum and is configured to inject a reducing agent to mix with exhaust gases within the plenum.

In another embodiment according to the previous embodiment, an inlet to the first exhaust gas component defines a first direction of flow and an outlet out of the second exhaust gas component defines a second direction of flow opposite of the first direction of flow.

In another embodiment according to any of the previous embodiments, the non-uniform cross-sectional shape of the plenum comprises a continuously variable shape extending from the first end to the second end.

In another embodiment according to any of the previous embodiments, the plenum is configured to generate a first swirling direction for exhaust gas exiting the first exhaust component and a second swirling direction, opposite the first swirling direction, for exhaust gas entering the second exhaust component.

In another embodiment according to any of the previous embodiments, the plenum comprises a single-piece structure that extends from the first exhaust component to the second exhaust component.

In another exemplary embodiment, a vehicle exhaust system component assembly includes a first exhaust component defining a first central axis, and a SCR catalyst downstream of the first exhaust component that defines a second central axis that is spaced apart from and generally parallel to the first central axis. The first exhaust component and SCR are spaced apart from each other by an area. The plenum is positioned substantially within the area, and has a first end connected to the first exhaust component and a second end connected to the SCR catalyst. The plenum is defined by a non-uniform cross-sectional shape as the plenum extends along a length from the first end to the second end. A doser is mounted to the plenum and is configured to inject a reducing agent to mix with exhaust gases within the plenum.

In another embodiment according to any of the previous embodiments, the first end of the plenum is connected to an outlet end of the first exhaust component and the second end of the plenum is connected to a side wall of the SCR catalyst at a location between an inlet end and outlet end of the SCR catalyst.

In another embodiment according to any of the previous embodiments, the plenum is comprised of a stamped housing.

In another embodiment according to any of the previous embodiments, the stamped housing comprises a single-piece structure that extends from a housing of the DPF to a housing of the SCR catalyst.

DETAILED DESCRIPTION

Figure 1:
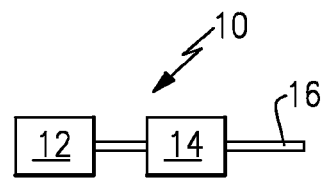
FIG. 1 is a schematic view of a vehicle exhaust system incorporating the subject invention.

FIG. 1 shows a vehicle exhaust system 10 that conducts hot exhaust gases generated by an engine 12 through various upstream exhaust components 14 to reduce emission and control noise as known. The various exhaust components 14 receive engine exhaust gases at a location downstream of the engine 12 and direct treated exhaust gases to an external environment via a tailpipe or outlet pipe 16. The various exhaust components 14 can include one or more of the following: pipes, filters, valves, catalysts, burners, mufflers etc.

Figure 2:
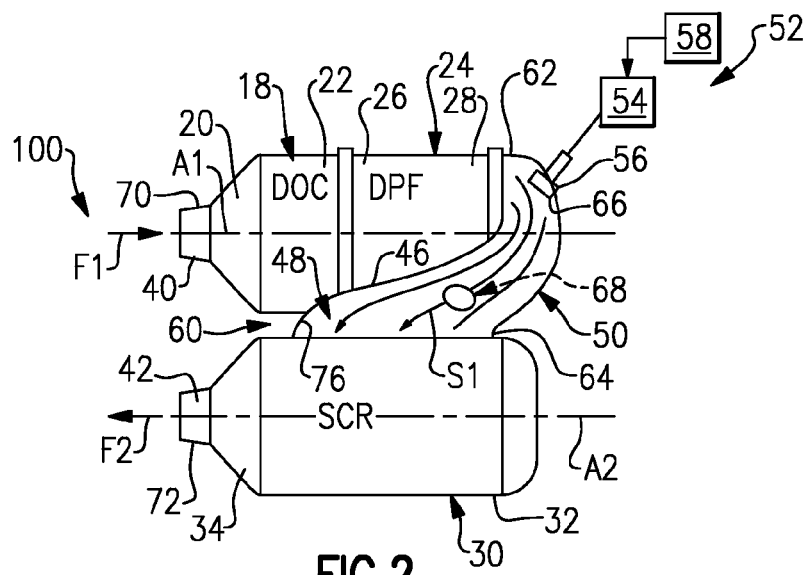
FIG. 2 is a schematic front view of a plenum connecting first and second exhaust components of an assembly.

FIG. 2 shows one example configuration for the exhaust components 14 that comprises an exhaust component assembly 100. In this example configuration the engine exhaust gases are directed into a diesel oxidation catalyst (DOC) 18 having an inlet end 20 and an outlet end 22. In one example, downstream of the DOC 18 is a diesel particulate filter (DPF) 24 that is used to remove contaminants from the exhaust gas as known. The DPF 24 has an inlet end 26 and an outlet end 28. Downstream of the DPF 24 is a selective catalytic reduction (SCR) catalyst 30 having an inlet end 32 and an outlet end 34. The DOC 18 and SCR catalyst 30 operate as known. Thus, in this example configuration the exhaust component assembly 100 is comprised of a DOC 18, a DPF 24, and a SCR catalyst 30. It should be understood that additional exhaust components 14 could be located upstream and/or downstream of the exhaust component assembly 100. Further, it should be understood that the DOC 18 or DPF 24 can be an optional component and may not be utilized in all assemblies.

The assembly 100 includes an inlet pipe 40 and an outlet pipe 42. The inlet pipe 40 is located at the inlet end 20 of the DOC 18. The outlet pipe 42 is located at the outlet end 34 of the SCR catalyst 30. The outlet pipe 42 communicates exhaust gases to any additional downstream exhaust components. In the example, shown, the inlet 40 and outlet 42 pipes comprise tubular connectors that are welded, brazed, fastened, etc. respectively to the DOC and SCR catalyst housings.

A plenum 50 is used to fluid connect the DPF 24 to the SCR catalyst 30. The plenum 50 is defined by an outer housing 46 that defines and encloses an uninterrupted open internal area 48.

An injection system 52 is used to inject a reducing agent, such as a solution of urea and water for example, into the exhaust gas stream within the plenum 50. Within the plenum 50, the reducing agent and exhaust gas are thoroughly mixed together prior to entering the SCR catalyst 30. In one example, the injection system 52 includes a fluid supply 54, a doser 56, and a controller 58 that controls injection of the reducing agent as known.

The DOC 18 and DPF 24 are connected directly to each other and cooperate to define a first center axis A1. The SCR catalyst 30 which is downstream of the DPF 24 defines a second center axis A2 that is spaced apart from and generally parallel to the first center axis A1. The DOC 18/DPF 24 and the SCR catalyst 30 are spaced apart from each other by an open area 60. The plenum 50 is positioned substantially within this open area 60 and has a first end 62 connected to the DPF 24 and a second end 64 connected to the SCR catalyst 30. The plenum 50 is defined by a non-uniform cross-sectional shape as the plenum 50 extends along a length from the first end 62 to the second end 64.

The doser 56 is mounted to the outer housing 46 of the plenum 50 at one of various possible locations. In one example, the doser 56 is mounted immediately adjacent the outlet end 28 of the DPF 24 at the first end 62 of the plenum 50 as indicated at mount area 66. Other possible mount areas are schematically indicated at 68 (see FIGS. 2 and 3).

In one example, the non-uniform cross-sectional shape of the plenum 50 comprises a continuously variable shape extending from the first end 62 to the second end 64.

Thus, the plenum 50 comprises an amorphous shape that is used to substantially fill the unused, open area 60 between the DOC 18 and SCR catalyst 30.

Figure 4:
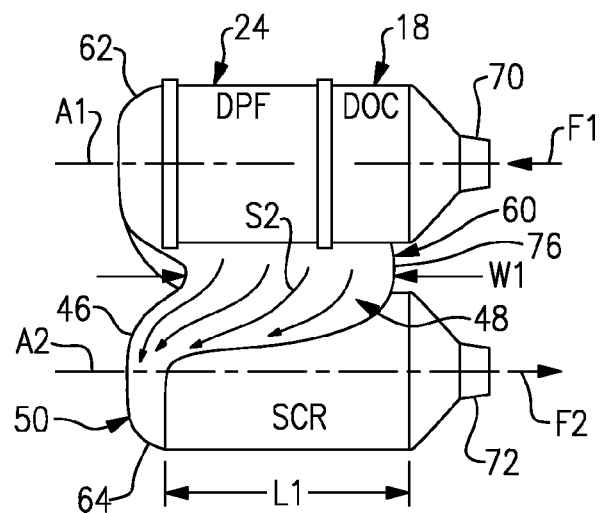
FIG. 4 is a back view of the assembly of FIG. 2.

The plenum 50 incudes a center portion 76 between the first 62 and second 64 ends that is substantially enlarged compared to the ends 62, 64. As shown in FIGS. 2 and 4, the center portion 76 has a width W1 that is almost as great as a length L1 of the SCR catalyst 30. The width W1 defines an outer dimension of the housing 46 of a widest open internal area portion within the plenum 50. This widest open internal area portion is almost as long as the length L1. In one example, this widest open internal area portion is at least 75% of L1. This increased area significantly improves the mixing of the injected reducing agent and exhaust gas.

Figure 3:
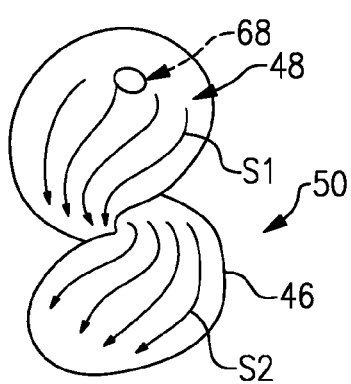
FIG. 3 is an end view of the plenum of FIG. 2.

As shown in FIG. 3, the plenum 50 is configured to generate a first swirling direction Si for exhaust gas exiting the DPF 24 and a second swirling direction S2, opposite the first swirling direction S1, for exhaust gas entering the SCR catalyst 30. The change in swirling direction further enhances thorough mixing.

In one example, the plenum 50 comprises a single-piece structure that extends directly from the DPF 24 to the SCR catalyst 30. The single-piece structure is preferably comprised of a stamping such that the outer housing 46 comprises a stamped housing.

The assembly 100 includes an inlet 70 to the DPF 24 and/or DOC 18 that defines a first direction of flow F1 and an outlet 72 out of the SCR catalyst 30 that defines a second direction of flow F2 opposite of the first direction of flow F1. In one example, the inlet 70 comprises a first tube that is co-axial with the first center axis A1, and the outlet 72 comprises a second tube that is co-axial with the second center axis A2.

The subject invention provides a unique plenum 50 that thoroughly mixes an injected reducing agent and exhaust gases prior to entering the SCR catalyst 30. The plenum 50 is configured to take advantage of unused area between a leg of the assembly including at least one of the DOC 18 and DPF 24 and a leg of the assembly that includes the SCR catalyst 30 to reduce the overall length of the assembly 100 and to reduce overall packaging size.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A vehicle exhaust system component assembly comprising:
   a first exhaust component defining a first center axis along an exhaust gas flow path;
   a second exhaust component downstream of the first exhaust component and defining a second center axis that is spaced apart from and generally parallel to the first center axis, wherein the second exhaust component encloses a catalyst substrate, and wherein the first and second exhaust components are spaced apart from each other by an area that extends along a length of the second exhaust component that is defined along a direction that extends along the second center axis;
   a plenum positioned within the area, the plenum having a first end connected to the first exhaust component and a second end connected to the second exhaust component, and a center portion that extends between the first and second ends, and wherein the plenum is defined by a non-uniform cross-sectional shape as the plenum extends along a length from the first end to the second end, and wherein the center portion has a width that defines the widest open internal area of the plenum, wherein the plenum extends along at least 75% of the length of the catalyst substrate; and
   a doser mounted to the plenum, the doser configured to inject a reducing agent to mix with exhaust gases within the plenum.

2. The vehicle exhaust system component assembly according to claim 1 including an inlet to the first exhaust gas component that defines a first direction of flow and an outlet out of the second exhaust gas component that defines a second direction of flow opposite of the first direction of flow.

3. The vehicle exhaust system component assembly according to claim 2 wherein the inlet comprises a first tube that is co-axial with the first center axis, and wherein the outlet comprises a second tube that is co-axial with the second center axis.

4. The vehicle exhaust system component assembly according to claim 1 wherein the non-uniform cross-sectional shape of the plenum comprises a continuously variable shape extending from the first end to the second end.

5. The vehicle exhaust system component assembly according to claim 1 wherein the plenum is configured to generate a first swirling direction for exhaust gas exiting the first exhaust component and a second swirling direction, opposite the first swirling direction, for exhaust gas entering the second exhaust component.

6. The vehicle exhaust system component assembly according to claim 1 wherein the first exhaust component comprises a DOC and the second exhaust component comprises a SCR catalyst that includes the catalyst substrate.

7. The vehicle exhaust system component assembly according to claim 6 including a DPF positioned downstream of the DOC and upstream of the plenum.

8. The vehicle exhaust system component assembly according to claim 1 wherein the plenum comprises a single-piece structure that extends from the first exhaust component to the second exhaust component.

9. A vehicle exhaust system component assembly comprising:
a first exhaust component defining a first central axis along an exhaust gas flow path;
a SCR catalyst downstream of the first exhaust component and defining a second central axis that is spaced apart from and generally parallel to the first central axis, the first exhaust component and SCR being spaced apart from each other by an area that extends along a length of the SCR catalyst that is defined between a SCR inlet and a SCR outlet;
a plenum positioned within the area, the plenum having a first end connected to the first exhaust component and a second end connected to the SCR catalyst, and a center portion that extends along at least a portion of the length of the SCR catalyst, and wherein the plenum is defined by a non-uniform cross-sectional shape as the plenum extends along a length from the first end to the second end, and wherein the center portion has a width that defines the widest open internal area of the plenum, and wherein the width extends along at least 75% of the length of the SCR catalyst; and
a doser mounted to the plenum, the doser configured to inject a reducing agent to mix with exhaust gases within the plenum.

10. The vehicle exhaust system component assembly according to claim 9 including an inlet to the first exhaust component to define a first direction of flow and wherein the SCR outlet out of the SCR catalyst defines a second direction of flow opposite of the first direction of flow.

11. The vehicle exhaust system component assembly according to claim 10 wherein the inlet comprises a first tube that is co-axial with the first center axis, and wherein the SCR outlet comprises a second tube that is co-axial with the second center axis.

12. The vehicle exhaust system component assembly according to claim 9 wherein the non-uniform cross-sectional shape of the plenum comprises a continuously variable shape extending from the first end to the second end.

13. The vehicle exhaust system component assembly according to claim 9 wherein the plenum is configured to generate a first swirling direction for exhaust gas exiting the first exhaust component and a second swirling direction, opposite the first swirling direction, for exhaust gas entering the SCR catalyst.

14. The vehicle exhaust system component assembly according to claim 9 wherein the plenum is comprised of a stamped housing.

15. The vehicle exhaust system component assembly according to claim 14 wherein the stamped housing comprises a single-piece structure that extends from a housing of the first exhaust component to a housing of the SCR catalyst.

16. The vehicle exhaust system component assembly according to claim 9 wherein the first end of the plenum is connected to an outlet end of the first exhaust component and wherein the second end of the plenum is connected to a side wall of the SCR catalyst at a location between an inlet end and outlet end of the SCR catalyst.

17. The vehicle exhaust system component assembly according to claim 9 wherein the plenum comprises an amorphous shape having an open center area that has a length that is almost as long as an overall length of the SCR catalyst.

18. The vehicle exhaust system component assembly according to claim 9 wherein the first exhaust component comprises at least one of a DOC and a DPF.

19. The vehicle exhaust system component assembly according to claim 18 wherein the first exhaust component comprises the DOC and the DPF which is downstream of the DOC, and including an inlet to the DOC to define a first direction of flow and wherein the SCR outlet out of the SCR catalyst defines a second direction of flow opposite of the first direction of flow.

20. The vehicle exhaust system component assembly according to claim 19 wherein the first end of the plenum is connected to an outlet end of the DPF, and wherein the second end of the plenum is connected to a side wall of the SCR catalyst at a location between an inlet end and outlet end of the SCR catalyst.

21. The vehicle exhaust system component assembly according to claim 19 wherein the DPF defines a DPF length and the DOC defines a DOC length that each extend in a direction along the first central axis, and wherein the center portion of the plenum extends along the DPF length and along at least a portion of the DOC length to fill the area between the SCR catalyst, DOC and DPF.

22. A vehicle exhaust system component assembly comprising:
a first exhaust component defining a first center axis along an exhaust gas flow path;
a second exhaust component downstream of the first exhaust component and defining a second center axis that is spaced apart from and parallel to the first center axis, wherein the second exhaust component encloses a catalyst substrate, and wherein the first and second exhaust components are spaced apart from each other by an open area extending along lengths of the first and second exhaust components that are defined along a direction that extends along the respective first and second center axes; and
a plenum positioned within the open area, the plenum having a first end connected to the first exhaust component, a second end connected to the second exhaust component, and a center portion that extends between the first and second ends, and wherein the plenum is defined by a non-uniform cross-sectional shape as the plenum extends along a plenum length from the first end to the second end, and wherein the center portion has a plenum width that is wider than a width at the first end and the second end, and wherein the plenum width defines the widest open internal area of the plenum, and wherein plenum extends along at least 75% of the length of the second exhaust component.

23. The vehicle exhaust system component assembly according to claim 22 wherein first exhaust component encloses a catalyst substrate, and wherein the plenum substantially fills the open area and extends along the length of the first exhaust component.

* * * * *